US012612263B2

(12) United States Patent
Akiyama et al.

(10) Patent No.: US 12,612,263 B2
(45) Date of Patent: Apr. 28, 2026

(54) CONVEYANCE APPARATUS AND CONVEYANCE METHOD

(71) Applicant: PACRAFT Co., Ltd., Tokyo (JP)

(72) Inventors: Taiga Akiyama, Yamaguchi-ken (JP);
Hideo Sago, Yamaguchi-ken (JP)

(73) Assignee: PACRAFT CO., LTD., Tokyo (JP)

( * ) Notice: Subject to any disclaimer, the term of this
patent is extended or adjusted under 35
U.S.C. 154(b) by 0 days.

(21) Appl. No.: 19/043,967

(22) Filed: Feb. 3, 2025

(65) Prior Publication Data

US 2025/0263249 A1     Aug. 21, 2025

(30) Foreign Application Priority Data

Feb. 20, 2024     (JP) ................................. 2024-023701

(51) Int. Cl.
*B65G 47/30*          (2006.01)
(52) U.S. Cl.
CPC ...... *B65G 47/30* (2013.01); *B65G 2201/0217*
(2013.01)
(58) Field of Classification Search
CPC ............ B65B 35/32; B65G 2201/0217; B65G
29/02; B65G 47/24; B65G 47/30
See application file for complete search history.

(56) References Cited

U.S. PATENT DOCUMENTS

| | | | | |
|---|---|---|---|---|
| 3,235,060 | A | * | 2/1966 | Gamberini ............. A24C 5/326 |
| | | | | 198/408 |
| 5,480,021 | A | * | 1/1996 | Belvederi .............. A24C 5/322 |
| | | | | 198/471.1 |
| 6,247,577 | B1 | * | 6/2001 | Dahlgrun ............. B65G 47/848 |
| | | | | 198/417 |
| 6,325,201 | B1 | * | 12/2001 | Bailey ...................... B65H 3/42 |
| | | | | 198/471.1 |
| 2005/0082141 | A1 | * | 4/2005 | Dombek ................ A24C 5/326 |
| | | | | 198/474.1 |
| 2021/0354916 | A1 | * | 11/2021 | Reynolds ............... B65G 25/08 |
| 2022/0046977 | A1 | * | 2/2022 | Zadecki ............... B65G 47/847 |
| 2023/0021384 | A1 | * | 1/2023 | Schombert ......... B65G 47/1464 |

FOREIGN PATENT DOCUMENTS

JP          2018-016336 A       2/2018

* cited by examiner

*Primary Examiner* — Himchan Song
(74) *Attorney, Agent, or Firm* — Pillsbury Winthrop Shaw
Pittman, LLP

(57)          ABSTRACT

A conveyance apparatus that conveys a plurality of stick-
shaped objects, includes: a holding member that includes a
holding space, a supply opening section and a release
opening section, the supply opening section and the release
opening section being connected to the holding space; and a
movement driving unit that causes the holding member to
move along an endless track including a supply section and
a release section, wherein: the holding member receives
supply of the plurality of stick-shaped objects via the supply
opening section at the supply section and the plurality of
stick-shaped objects are held in the holding space, and the
holding member releases the plurality of stick-shaped
objects from the holding space towards outside via the
release opening section, at the release section.

14 Claims, 7 Drawing Sheets

CONVEYANCE APPARATUS AND CONVEYANCE METHOD

CROSS-REFERENCE TO RELATED APPLICATIONS

This application is based upon and claims the benefit of priority from Japanese Patent Application No. 2024-023701, filed on Feb. 20, 2024; the entire contents of which are incorporated herein by reference.

TECHNICAL FIELD

The present disclosure relates to a conveyance apparatus and a conveyance method that convey stick-shaped objects.

BACKGROUND ART

Japanese patent application publication No. 2018-016336 discloses an apparatus that supplies a large number of stick-shaped objects to be packaged together, into a cup for conveyance or a package bag used in a packaging machine.

SUMMARY OF THE INVENTION

For devices that convey a large number of stick-shaped objects one after another while changing their posture, it is required to efficiently convey the large number of stick-shaped objects while accurately changing the stick-shaped objects to a desired posture.

One of the purposes of the present disclosure is to provide an apparatus and related technology advantageous for efficiently conveying a plurality of stick-shaped objects while changing the plurality of stick-shaped objects to a desired posture.

An aspect of the present disclosure is directed to a conveyance apparatus that conveys a plurality of stick-shaped objects, the conveyance apparatus comprising: a holding member that includes a holding space, a supply opening section and a release opening section, the supply opening section and the release opening section being connected to the holding space; and a movement driving unit that causes the holding member to move along an endless track including a supply section and a release section, wherein: the holding member receives supply of the plurality of stick-shaped objects via the supply opening section at the supply section and the plurality of stick-shaped objects are held in the holding space, and the holding member releases the plurality of stick-shaped objects from the holding space towards outside via the release opening section, at the release section.

The endless track may be a track that is centered on a central axis, and the central axis may form an angle greater than 0 degrees and less than 90 degrees with respect to a horizontal axis extending in a horizontal direction.

A plurality of holding members may be provided, and the movement driving unit may cause the plurality of holding members to move along the endless track.

The conveyance apparatus may comprise a first popping-out restricting unit that is installed with the holding member to move along with the holding member along the endless track, opens the supply opening section at the supply section, and at least partially covers the supply opening section to restrict the plurality of stick-shaped objects from popping out from the holding space via the supply opening section during the holding member moving along at least a part of a conveyance track section that is a section of the endless track between the supply section and the release section.

The first popping-out restricting unit may have a first shutter and a second shutter that are able to be placed in an open position where the supply opening section is opened and in a closed position where the supply opening section is closed, and each of the first shutter and the second shutter may have a shutter body and a shutter uprise portion connected to one end portion of the shutter body, the shutter body covering the supply opening section in a closed position and at least partially opening the supply opening section in an open position.

The conveyance apparatus may comprise a second popping-out restricting unit that is installed with the holding member to move along with the holding member along the endless track, opens the release opening section at the release section, and at least partially covers the release opening section to restrict the plurality of stick-shaped objects from popping out from the holding space via the release opening section during the holding member moving along at least a part of a conveyance track section that is a section of the endless track between the supply section and the release section.

The conveyance apparatus may comprise a first popping-out restricting unit that extends along at least a part of a conveyance track section that is a section of the endless track between the supply section and the release section and restricts the plurality of stick-shaped objects from popping out from the holding space via the supply opening section in at least a part of the conveyance track section.

The holding member may have a notch, and during the holding member moving in at least a part of the conveyance track section, at least a part of the first popping-out restricting unit may be positioned in the holding space while penetrating the notch.

The conveyance apparatus may comprise a second popping-out restricting unit that extends in an arc shape along at least a part of a conveyance track section that is a section of the endless track between the supply section and the release section, and faces an end surface potion of the holding member demarcating the release opening section in at least a part of the conveyance track section to restrict the plurality of stick-shaped objects from popping out from the holding space via the release opening section: wherein the end surface portion may have a curved surface shape that adapts to a curved surface of a restriction surface facing the end surface portion of the second popping-out restricting unit.

The conveyance apparatus may comprise: a popping-out detection sensor that detects pop-out of the plurality of stick-shaped objects from the holding space of the holding member in a conveyance track section that is a section of the endless track between the supply section and the release section; and a control unit that receives detection results by the popping-out detection sensor.

The conveyance apparatus may comprise a relay storage unit that temporarily stores the plurality of stick-shaped objects released from the holding member via the release opening section and releases the plurality of stick-shaped objects towards a container, wherein the relay storage unit may move between a relay supply position for receiving the plurality of stick-shaped objects released from the holding member via the release opening section and a relay release position for releasing the plurality of stick-shaped objects towards the container.

The conveyance apparatus may comprise a control unit, wherein the movement driving unit may have a servo motor that is driven under control of the control unit.

Another aspect of the present invention is directed to a conveyance method of conveying a plurality of stick-shaped objects by using a conveyance apparatus, wherein: the conveyance apparatus comprises: a holding member that includes a holding space, a supply opening section and a release opening section, the supply opening section and the release opening section being connected to the holding space; and a movement driving unit that causes the holding member to move along an endless track including a supply section and a release section, the conveyance method comprising the steps of: supplying the plurality of stick-shaped objects to the holding member via the supply opening section at the supply section, the plurality of stick-shaped objects being held in the holding space; and releasing the plurality of stick-shaped objects from the holding space to outside via the release opening section at the release section.

The conveyance apparatus may comprise a first shutter and a second shutter that are able to be placed in an open position where the supply opening section is opened and in a closed position where the supply opening section is closed, and at the release section, gas may be blown towards at least one of the following: between the first shutter and the second shutter, and between the holding member and at least one of the first shutter and the second shutter.

According to the present disclosure, it is advantageous to efficient conveyance of a plurality of stick-shaped objects while changing the plurality of stick-shaped objects to a desired posture.

DETAILED DESCRIPTION

In the following, a case in which a conveyance apparatus of the present disclosure is embodied as a stick introduction machine (a stick-shaped object supply device), which is an apparatus that introduces a plurality of stick-shaped objects into a container (in particular, a bag), is described by way of example, but may be embodied as any other device.

Further, in the following description, stick-shaped objects can be configured as food or daily necessities but may also be objects used for any other purpose.

First Embodiment

Figure 1:
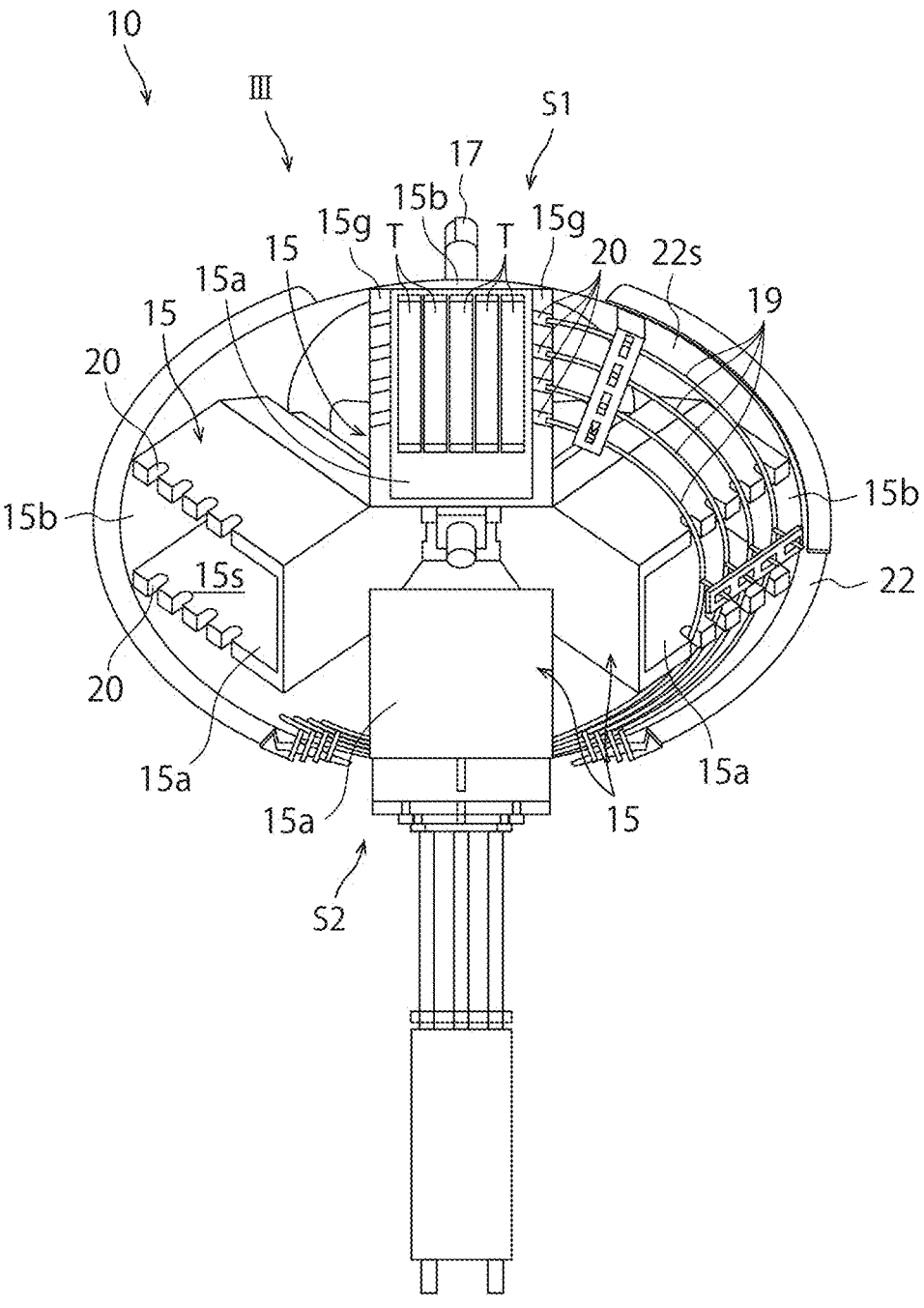
FIG. 1 is a plan view showing a portion of an example of a stick introduction machine according to a first embodiment.
Figure 2:
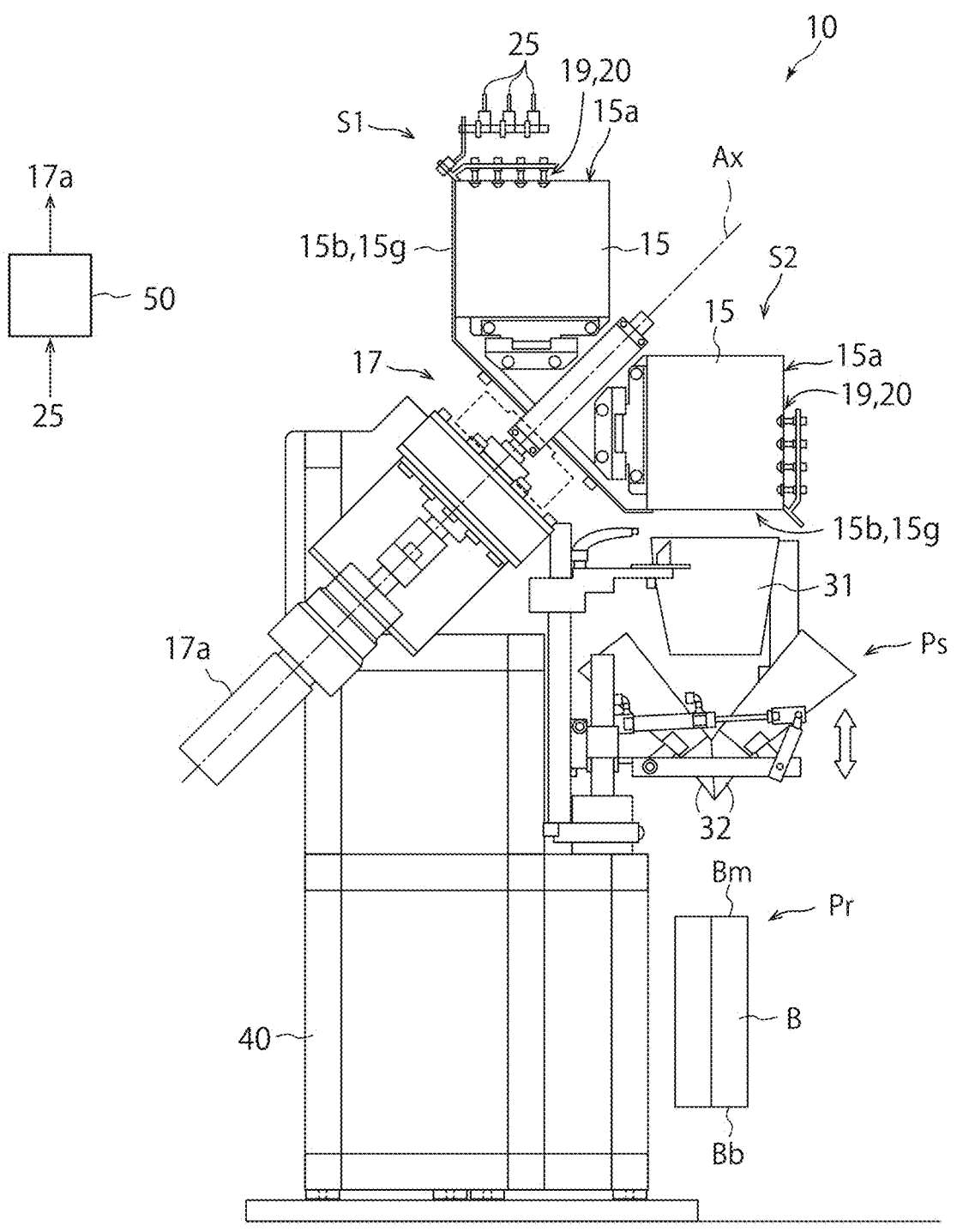
FIG. 2 is a side view of the entire stick introduction machine shown in FIG. 1.
Figure 3:
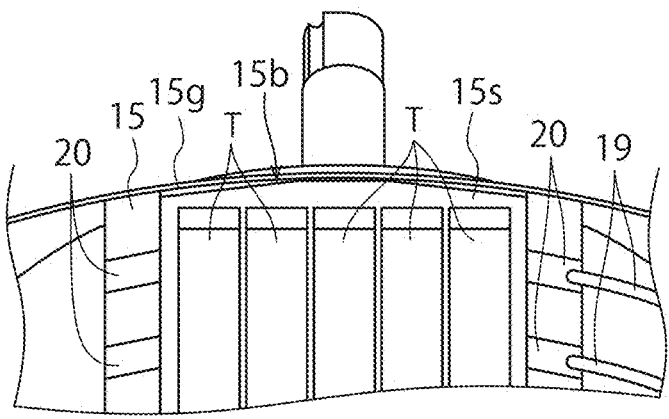
FIG. 3 is an enlarged view of an area (a tray) indicated by reference numeral "III" in FIG. 1.

FIG. 1 is a plan view showing a portion of an example of a stick introduction machine 10 according to a first embodiment. FIG. 2 is a side view of the entire stick introduction machine 10 shown in FIG. 1. For ease of understanding, some elements (e.g., some trays 15) are omitted in FIG. 2. FIG. 3 is an enlarged view of a section (a tray 15) indicated by reference numeral "III" in FIG. 1.

The stick introduction machine (a conveyance apparatus) 10 of the present embodiment receives a plurality of stick-shaped objects T supplied from a stick-shaped object supply device (not shown) provided upstream, conveys the plurality of stick-shaped objects T while changing the posture of the plurality of stick-shaped objects T, and introduces the plurality of stick-shaped objects T into a bag B that is to be transferred by a bag transfer device (not shown) provided downstream.

The stick introduction machine 10 comprises a plurality of trays (holding members; in the present example, four trays) 15 and a movement driving unit 17 that moves the plurality of trays 15 along an endless track (in the present example, a circular track around a central axis Ax). The endless track includes: a supply section S1 for supplying a plurality of stick-shaped objects T to each tray 15; and a release section S2 for releasing a plurality of stick-shaped objects T from each tray 15.

The central axis Ax, which forms a reference for the endless track, forms an angle greater than 0 degrees and less than 90 degrees with respect to a horizontal axis extending in the horizontal direction. Therefore, the endless track based on the central axis Ax extends both in the horizontal direction and in the height direction (the vertical direction). The central axis Ax in the present example extends to form an angle of 45 degrees with respect to each of a horizontal axis extending in the horizontal direction and a perpendicular line (a vertical line) extending in the height direction (see FIG. 2).

The direction in which the central axis Ax extends is not limited. From a perspective of smoothly performing the supply of stick-shaped objects T into each tray 15 and the release of stick-shaped objects T from each tray 15, the angle formed by the central axis Ax with respect to the horizontal axis may be in the range of, for example, 25 to 65 degrees, more preferably in the range of 35 to 55 degrees, more preferably may be 45 degrees or an angle closer to 45 degrees.

Each tray 15 comprises: a holding space 15s; and a supply opening section 15a and a release opening section 15b that are connected and communicated to the holding space 15s. The trays 15 shown in FIGS. 1 to 3 each have a box-like shape as a whole, with an inner space having a trapezoidal-like cross-sectional shape provided as a holding space 15s. The supply opening section 15a and the release opening section 15b are positioned adjacent to each other and extend to form an approximately right angle with respect to each other.

Each tray 15 receives supply of a plurality of stick-shaped objects T at the supply section S1 of the endless track, and the plurality of stick-shaped objects T are introduced into the holding space 15s via the supply opening section 15a and are held in the holding space 15s. Further, each tray 15 releases a plurality of stick-shaped objects T, at the release section S2 of the endless track, from the holding space 15s towards the outside (in the present example, towards a first funnel 31 (a relay storage unit)) through the release opening section 15b.

In the present embodiment, the supply section S1 is assigned to the highest section (the topmost section) of the endless track along which each tray 15 moves. On the other hand, the release section S2 is assigned to the lowest section (the lowermost section) of the endless track along which each tray 15 moves.

While each tray 15 moves along the endless track, the posture of each tray 15 relative to the central axis Ax remains basically unchanged, but taken as a whole, the posture (orientation) of each tray 15 changes according to the position of each tray 15 on the endless track.

For instance, in a tray 15 positioned at the supply section S1, the supply opening section 15*a* opens in the upward direction and the release opening section 15*b* opens in the horizontal direction (in particular, in the leftward direction in FIG. 2). On the other hand, in a tray 15 positioned at the release section S2, the supply opening section 15*a* opens in the horizontal direction (in particular, in the rightward direction in FIG. 2) and the release opening section 15*b* opens in the downward direction. In particular, the central axis Ax forming 45 degrees with respect to the horizontal axis makes it possible that the supply opening section 15*a* of a tray 15 positioned at the supply section S1 faces right above while the release opening section 15*b* of a tray 15 positioned at the release section S2 faces right below. As a tray 15 moves between the supply section S1 and the release section S2, the orientation and the posture of the tray 15 continuously change, and the supply opening section 15*a* and the release opening section 15*b* are oriented in desired directions described above at each of the supply section S1 and the release section S2.

The movement driving unit 17 in the present example has a servo motor 17*a* as the driving source. The servo motor 17*a* outputs rotary power under the control of a control unit 50 to move each tray 15 intermittently along the endless track.

The stick introduction machine 10 in the present embodiment further comprises guides (a first popping-out restricting unit) 19, a cover (a second popping-out restricting unit) 22 and detection sensors 25.

The guides 19 extend along at least a part of a conveyance track section that is the section of the endless track, along which each tray 15 moves, between the supply section S1 and the release section S2 (in particular, the section where each tray 15 moves from the supply section S1 towards the release section S2). The guides 19 restrict a plurality of stick-shaped objects T from popping out of the holding space 15*s* of each tray 15 through the supply opening section 15*a*, in at least a part of the conveyance track section.

In the example shown in FIGS. 1 through 3, a plurality of guides (four guides) 19 each extending in a line-like appearance (in an elongated shape (e.g., in a round stick shape)) are provided, and each guide 19 extends over the entire conveyance track section where each tray 15 moves from the supply section S1 towards the release section S2 (see FIG. 1 for example). Each guide 19 is fixedly supported by the cover 22 and is positioned to cover the supply opening section 15*a* of a tray 15 moving from the supply section S1 towards the release section S2. Thus, each guide 19 can physically block stick-shaped objects T that are likely to pop out of a holding space 15*s* through the supply opening section 15*a*.

Each guide 19 does not cover the supply opening section 15*a* of a tray 15 at least at the supply section S1. As a result, the supply of a plurality of stick-shaped objects T to a tray 15 (a holding space 15*s*) through a supply opening section 15*a* at the supply section S1 is not obstructed by each guide 19.

Each tray 15 in the present example has notches 20, and during each tray 15 moving in at least a part of the conveyance track section, at least a part of each guide 19 is located in the holding space 15*s* of each tray 15 while penetrating notches 20. In the example shown in FIGS. 1 to

3, a plurality of notches 20 (four notches 20 on each of two edge portions (the end surface) (eight notches 20 in total)) are formed on the end surface (the supply side end surface portion) of a tray 15 that demarcates a supply opening section 15*a*. While a tray 15 moves from the supply section S1 to the release section S2, each guide 19 is positioned in a corresponding notch 20 of a tray 15 and is partially located in the holding space 15*s* of the tray 15.

As a result of the notches 20 thus provided, each guide 19 is positioned closer to a plurality of stick-shaped objects T stored in a tray 15 (a holding space 15*s*) and it is possible to effectively prevent the plurality of stick-shaped objects T from flying out of and falling from the tray 15.

The cover 22 extends along at least a part of the conveyance track section that is the section of the endless track, along which each tray 15 moves, between the supply section S1 and the release section S2 (in particular, the section where each tray 15 moves from the supply section S1 towards the release section S2). The cover 22 restricts a plurality of stick-shaped objects T from popping out of the holding space 15*s* of each tray 15 through the release opening section 15*b* in at least a part of the conveyance track section.

In the example shown in FIGS. 1 to 3, a single cover 22 in the form of a plate extending in an arc shape is provided, and the cover 22 extends over the entire conveyance track section where each tray 15 moves from the supply section S1 towards the release section S2 (see FIG. 1 for example). The cover 22 is fixedly supported by a support trestle 40, and is positioned to cover the release opening section 15*b* of a tray 15 that is moving from the supply section S1 towards the release section S2. Thus, the cover 22 can physically block stick-shaped objects T that are likely to pop out of a holding space 15*s* through a release opening section 15*b*.

The cover 22 does not cover the release opening section 15*b* of a tray 15 at least at the release section S2. This makes it possible that the release of a plurality of stick-shaped objects T from a tray 15 (the holding space 15*s*) through the release opening section 15*b* at the release section S2 is not obstructed by the cover 22.

The cover 22 in the present example faces the release side end surface portion 15*g* of a tray 15 that demarcates the release opening section 15*b*, in at least a part of the conveyance track section where each tray 15 moves from the supply section S1 towards the release section S2, and restricts a plurality of stick-shaped objects T from popping out from the holding space 15*s* through the release opening section 15*b*.

The release side end surface portion 15*g* of each tray 15 has a curved surface shape that follows and adapts to the curved surface of a restriction surface 22*s* of the cover 22 that faces the release side end surface portion 15*g*, as shown in FIG. 3.

If the release side end surface portion 15*g* of each tray 15 has a non-curved shape (a flat shape), the variation in the distance between the arc-shaped cover 22 (in particular, the restriction surface 22*s*) and the release side end surface portion 15*g* tends to increase while each tray 15 is moving along the arc-shaped (curved) conveyance track section. Specifically, even if the distance (spacing) between the cover 22 and the both end portions of the release side end surface portion 15*g* of a tray 15 is relatively small, the distance (spacing) between the cover 22 and the center portion between the both end portions of the release side end surface portion 15*g* is relatively large. In this case, a relatively large space is created locally between the center of the release side end surface portion 15*g* and the cover 22. In such a case, a stick-shaped object T may enter this relatively large space and consequently a stick-shaped object T may easily become unintentionally pinched and trapped between a release side end surface portion 15g (a tray 15) and the cover 22.

On the other hand, according to a tray 15 in the present example, which has a release side end surface portion 15g with a curved shape that follows and adapts to the curved surface of the restriction surface 22s of the cover 22, the variation in the distance (spacing) between the release side end surface portion 15g and the cover 22 is reduced. Specifically, this makes it possible to make the distance (spacing) between the release side end surface portion 15g of a tray 15 and the cover 22 uniform throughout, effectively preventing the occurrence of a relatively large space locally between the center of the release side end surface portion 15g and the cover 22. Thus, the distance (spacing) between the release side end surface portion 15g of a tray 15 and the cover 22 can be made smaller overall. In this case, it is difficult for stick-shaped objects T to enter a space between a release side end surface portion 15g and the cover 22, effectively preventing stick-shaped objects T from being unintentionally pinched and trapped between the release side end surface portion 15g (a tray 15) and the cover 22.

The detection sensors 25 (see FIG. 2) detect the popping-out of a plurality of stick-shaped objects T through the supply opening section 15a from the holding space 15s of a tray 15 in the conveyance track section, which is a portion between the supply section S1 and the release section S2 (in particular, a portion where each tray 15 moves from the supply section S1 towards the release section S2) in the endless track, and sends the detection results to the control unit 50.

The detection sensors 25 are typically formed by an optical sensor, but may be formed by any other sensor.

The control unit 50 can receive the detection results from the detection sensors 25 and perform any processing based on the detection results by the detection sensors 25. For example, if the detection sensors 25 detect the popping out of a stick-shaped object T, the control unit 50 can issue a warning to the operator (not shown in the drawings) or can bring the operation of a part or all of the stick introduction machine 10 to an emergency stop.

The stick introduction machine 10 of the present embodiment further comprises a first funnel 31 and a second funnel 32.

The first funnel 31 is positioned directly below a tray 15 (in particular, the release opening section 15b) positioned at the release section S2 and is configured as a tubular body having a through hole extending in the height direction. The second funnel 32 is positioned, at least partially, directly below the first funnel 31 (in particular, the lower opening part including the lower end portion of the through hole) and has an opening-closing unit with a so-called coracoid shape.

In the example shown in FIGS. 1 to 3, the lower end portion of the first funnel 31 (in particular, the lower opening part) is positioned in a lower position compared to the upper end portion of the opening-closing unit of the second funnel 32, in particular, is positioned in the inner space of the second funnel 32 formed in a state where the opening-closing unit is closed.

The first funnel 31 and the second funnel 32 move up and down in an integrated manner. Specifically, the first funnel 31 and the second funnel 32 reciprocate between an upper position (a relay supply position Ps) and a lower position (a relay release position Pr) and stop intermittently at each of the relay supply position Ps and the relay release position Pr.

The first funnel 31 and the second funnel 32 thus configured act as a relay storage unit that temporarily stores a plurality of stick-shaped objects T released through the release opening section 15b from a tray 15 positioned at the release section S2, and after that, releases the plurality of stick-shaped objects T toward a bag B.

Specifically, the first funnel 31 and the second funnel 32 move between the relay supply position Ps for receiving a plurality of stick-shaped objects T released from a tray 15 via the release opening section 15b at the release section S2 and the relay release position Pr for releasing a plurality of stick-shaped objects T into a bag B positioned directly below the second funnel 32.

A plurality of stick-shaped objects T in a tray 15 (the holding space 15s) are conveyed along the endless track and are positioned at the release section S2, and consequently the plurality of stick-shaped objects T are released, under the influence of gravity, from the tray 15 (the holding space 15s) through the release opening section 15b towards the first funnel 31 which stops intermittently at the relay supply position Ps. In the example shown in FIGS. 1 to 3, while a tray 15 is moving from the supply section S1 towards the release section S2, the release opening section 15b is covered by the cover 22, preventing the release of stick-shaped objects T from the tray 15 through the release opening section 15b. Then, when a tray 15 is positioned at the release section S2, the release opening section 15b is no longer covered by the cover 22 and is opened, allowing a plurality of stick-shaped objects T in the tray 15 to fall naturally through the release opening section 15b.

The first funnel 31 guides a plurality of stick-shaped objects T that are released from a tray 15 and fall, toward the second funnel 32 being in a state where the opening-closing unit with a coracoid shape is closed, and as a result, the plurality of stick-shaped objects T are held and stored by the second funnel 32.

The relative position in the height direction between the first funnel 31 and the second funnel 32 is preferably determined in such a manner that a part (in particular, the top part) of each stick-shaped object T that is stored in the second funnel 32 is thus supported by the first funnel 31. In this case, the first funnel 31 and the second funnel 32 maintain the erect posture of each of the stick-shaped objects T stored in the second funnel 32.

Then, in a state where a plurality of stick-shaped objects T are stored in the second funnel 32, the first funnel 31 and the second funnel 32 move downward from the relay supply position Ps in an integrated manner and are placed at the relay release position Pr together with the plurality of stick-shaped objects T. As a result of the lower part of the second funnel 32 (in particular, the opening-closing unit with a coracoid shape) being placed in the relay release position Pr, the lower part of the second funnel 32 (in particular, the opening-closing unit with a coracoid shape) enters the inside of a bag B waiting intermittently below the second funnel 32 through the mouth portion Bm of the bag B being in an open state, while the opening-closing unit is kept in a closed state.

Then, when the opening-closing unit of the second funnel 32 is opened at the relay release position Pr, the plurality of stick-shaped objects T fall from the second funnel 32 under the influence of gravity while the plurality of stick-shaped objects T are in an upright posture, and are stored inside the bag B.

In the present example, as the opening-closing unit is opened in a state where the lower part of the second funnel 32 (in particular, the opening-closing unit with a coracoid shape) is being positioned inside a bag B, a plurality of stick-shaped objects T can be reliably introduced from the second funnel 32 into the bag B. The relative position between the second funnel 32 positioned in the relay release position Pr and a bag B (e.g., the closed bottom portion Bb) waiting intermittently below the second funnel 32 is determined in such a manner that the whole of a plurality of stick-shaped objects T introduced into the bag B from the second funnel 32 leave the second funnel 32 and are located in the inner space of the bag B.

Next, an example of the operation of the stick introduction machine 10 shown in FIGS. 1 through 3 above is described. The control unit 50 performs the control of various elements in such a manner that the operations of the stick introduction machine 10 described below is carried out.

First, a plurality of stick-shaped objects T are conveyed by the stick-shaped object supply device (not shown) to above the supply section S1 of the endless track, and after that, are supplied from the stick-shaped object supply device to a tray 15 positioned at the supply section S1 in a state where the plurality of stick-shaped objects T are in a lying posture (i.e., in a posture extending in a horizontal direction). The stick-shaped object supply device conveys sets of a plurality of stick-shaped objects T one after another to a location above the supply section S1, and sequentially supplies a set of a plurality of stick-shaped objects T to each of a plurality of trays 15 that are positioned one after another at the supply section S1.

Each tray 15 is conveyed from the supply section S1 towards the release section S2 by the movement driving unit 17, while holding a plurality of stick-shaped objects T, which have been supplied at the supply section S1, in the holding space 15*s*. In this process, the guides 19 and the cover 22 restrain the ejection and fall of the plurality of stick-shaped objects T from a tray 15, and the detection sensors 25 monitor the ejection of stick-shaped objects T from the tray 15.

Then, when a tray 15 reaches the release section S2, a plurality of stick-shaped objects T in the tray 15 fall in an upright posture (i.e., a posture extending in the height direction). A plurality of stick-shaped objects T falling in this manner are received and stored by the first funnel 31 and the closed second funnel 32 that wait at the relay supply position Ps.

A plurality of stick-shaped objects T are then descended from the relay supply position Ps together with the first funnel 31 and the second funnel 32 and are consequently positioned at the relay release position Pr. Then, by opening the opening-closing unit of the second funnel 32 at the relay release position Pr, a plurality of stick-shaped objects T fall from the first funnel 31 and the second funnel 32 towards a bag B in an open state waiting below the second funnel 32, and are consequently stored in the bag B.

After a plurality of stick-shaped objects T are stored in a bag B in this manner, the first funnel 31 and the second funnel 32 are raised from the relay release position Pr and are consequently positioned at the relay supply position Ps to stand by. The opening-closing unit of the second funnel 32 is adjusted from an open state to a closed state prior to being positioned at the relay supply position Ps or in the relay supply position Ps, and is made to wait at the relay supply position Ps in the closed state.

Then, by the movement driving unit 17, an empty tray 15 is caused to move downstream from the release section S2 while a next tray 15 holding a plurality of stick-shaped objects T is caused to move from upstream to be positioned at the release section S2. Then, the process of introducing a plurality of stick-shaped objects T from the next tray 15 into a bag B is performed in the same manner.

On the other hand, after the first funnel 31 and the second funnel 32 are raised from the relay release position Pr and the second funnel 32 escapes from and is separated from a bag B, the bag transfer device (not shown) transfers the bag B storing a plurality of stick-shaped objects T downstream and locates a new bag B storing no stick-shaped objects T below the second funnel 32 to stand by in a state where the new bag B is opened. The new bag B thus positioned below the second funnel 32 receives the supply of a plurality of stick-shaped objects T in an erect state through the first funnel 31 and the second funnel 32 from a next tray 15 positioned at the release section S2 as a result of the series of processes described above being carried out.

A device to promote properness of the posture of a plurality of stick-shaped objects T in a bag B may be provided. For example, a device (such as a tapping device) to apply vibration (e.g., tapping) to a bag B into which a plurality of stick-shaped objects T have been introduced may be provided.

The series of processes described above are performed by the actions of various devices working together, but the various devices can be made to collaborate with each other in any way desired. For example, sensors to detect the actions of various devices may be provided, and the control unit 50 may control the actions (e.g., operation timing) between devices in such a manner that the actions of various devices work together based on the detection results of the sensors. Further, the actions (e.g., operation timing) between devices may be controlled by a mechanical mechanism such as a cam mechanism, thereby causing the actions of the various devices to work together. In this case, sensors to detect the actions of various devices may not be installed, and various devices may not be controlled by the control unit 50.

As explained above, according to the present embodiment, each tray 15 can receive a plurality of stick-shaped objects T in a recumbent posture (a horizontal posture), convey the plurality of stick-shaped objects T while changing the plurality of stick-shaped objects T from the recumbent position to an erect posture (a perpendicular posture), and release the plurality of stick-shaped objects T being in the erect posture toward a bag B. In particular, as a plurality of trays 15 are moved repeatedly in circulation along the endless track by the rotary-type stick introduction machine 10, it is possible to efficiently convey a large number of stick-shaped objects T while changing the large number of stick-shaped objects T to a desired posture.

In particular, by providing a plurality of trays 15, to supply a plurality of stick-shaped objects T to a tray 15 and to release a plurality of stick-shaped objects T from another tray 15 can be simultaneously carried out, promoting more efficient and faster processing.

As described above, the stick introduction machine 10 of the present embodiment can perform the posture change process and the conveyance process of a plurality of stick-shaped objects T at high speed, and also can stably release a plurality of stick-shaped objects T in a desired upright posture and thus can stably introduce a plurality of stick-shaped objects T into a bag B.

On the other hand, it is difficult for the conventional devices to achieve the effects brought about by the stick introduction machine 10 of the present embodiment. For example, in the apparatus of Japanese patent application publication No. 2018-016336, a holder for stick-shaped objects to be packaged needs to be caused to reciprocate along an arc-shaped track along with a tubular rotating body, and therefore efficient processing is not necessarily performed and it is not easy to speed up processing.

In addition, the central axis that forms the center of the endless track forms an angle greater than 0 degrees and less than 90 degrees with respect to the horizontal axis (in the examples shown in FIGS. 1 to 3, forms 45 degrees), which allows the endless track as a whole to be inclined to both the horizontal axis and the perpendicular axis (vertical axis). This allows the vertical direction position to be shifted between the supply section S1 and the release section S2 and also allows the horizontal direction position to be shifted between the supply section S1 and the release section S2. Therefore, it is relatively easy to realize an equipment layout in which the supply of a plurality of stick-shaped objects T to a tray 15 at the supply section S1 and the release of a plurality of stick-shaped objects T from a tray 15 at the release section S2 do not interfere with each other.

The installation of the guides 19 and the cover 22 can also prevent stick-shaped objects T from popping out of and falling from a tray 15, and thus reduce the disorder of the posture of stick-shaped objects T in an tray 15. As a result, a plurality of stick-shaped objects T having a proper posture (in an erect posture) can be appropriately guided and introduced into a bag B.

In addition, since a plurality of stick-shaped objects T released from a tray 15 are guided and introduced into a bag B through first funnel 31 and the second funnel 32 (the relay storage unit), the distance of a one time drop of a plurality of stick-shaped objects T can be shortened. In particular, the first funnel 31 and the second funnel 32 receive a plurality of stick-shaped objects T at the upper position (the relay supply position Ps) and then are lowered and release the plurality of stick-shaped objects T toward a bag B at the lower position (the relay release position Pr). As a result, the force (impact force) acting on a plurality of stick-shaped objects T on their way from a tray 15 to the inside of a bag B can be reduced, the disorder of the stick-shaped objects T in the upright posture can be suppressed, and the plurality of stick-shaped objects T can be effectively stored in the bag B while maintaining the desired upright posture.

When a plurality of stick-shaped objects T are subjected to a relatively large force (impact force) during the process from a tray 15 to the inside of a bag B and the plurality of stick-shaped objects T in a disordered posture are led into the bag B, the stick-shaped objects T may pile up in the height direction within the bag B, and a part of the stick-shaped objects T may protrude from the bag B through the mouth portion Bm. In this case, the sealing process of the mouth portion Bm of the bag B, which is performed in a later stage, may be inhibited by the stick-shaped objects T and consequently not be performed properly.

Second Embodiment

Figure 4:
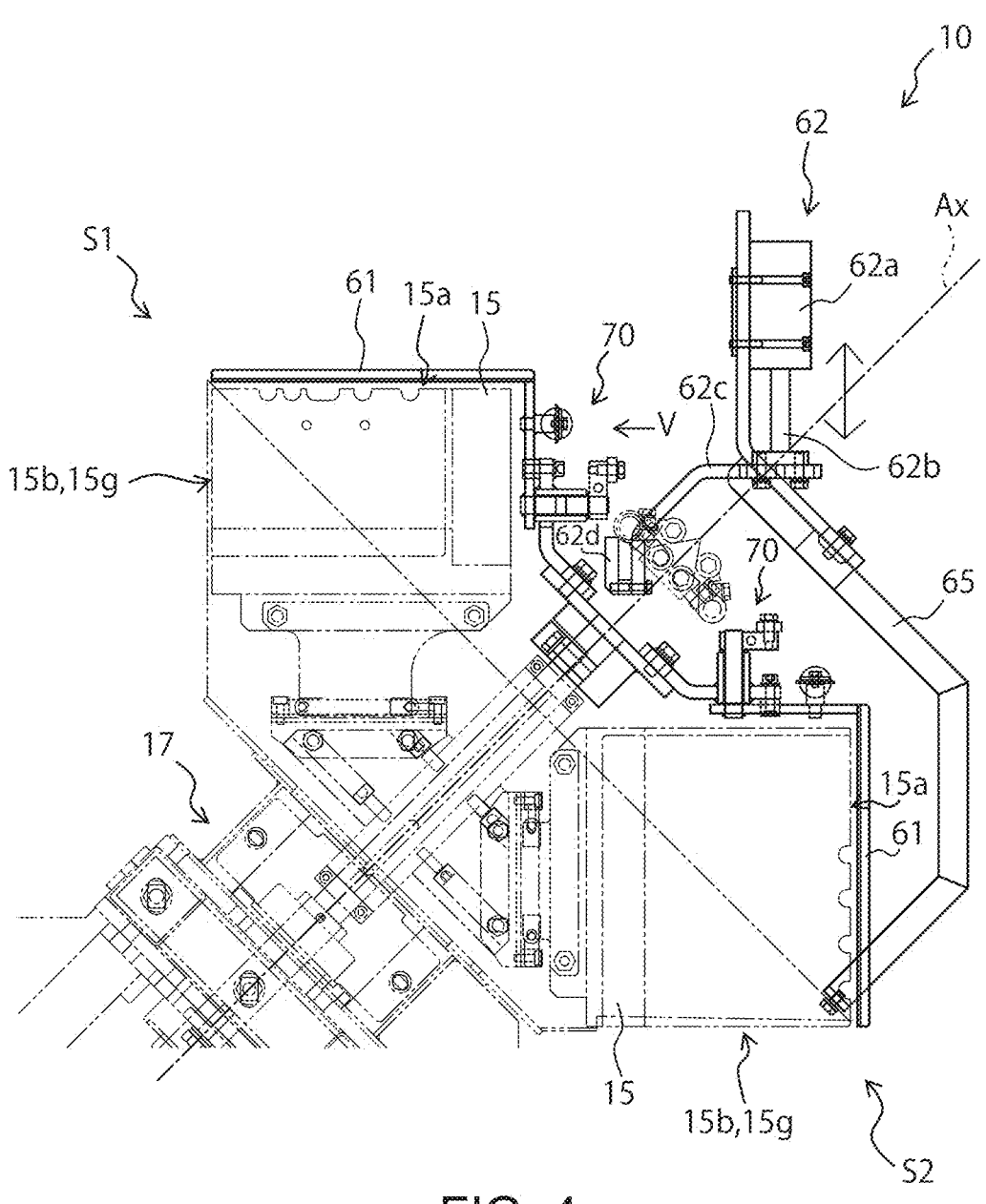
FIG. 4 is a side view showing a portion of an example of a stick introduction machine according to a second embodiment.
Figure 5:
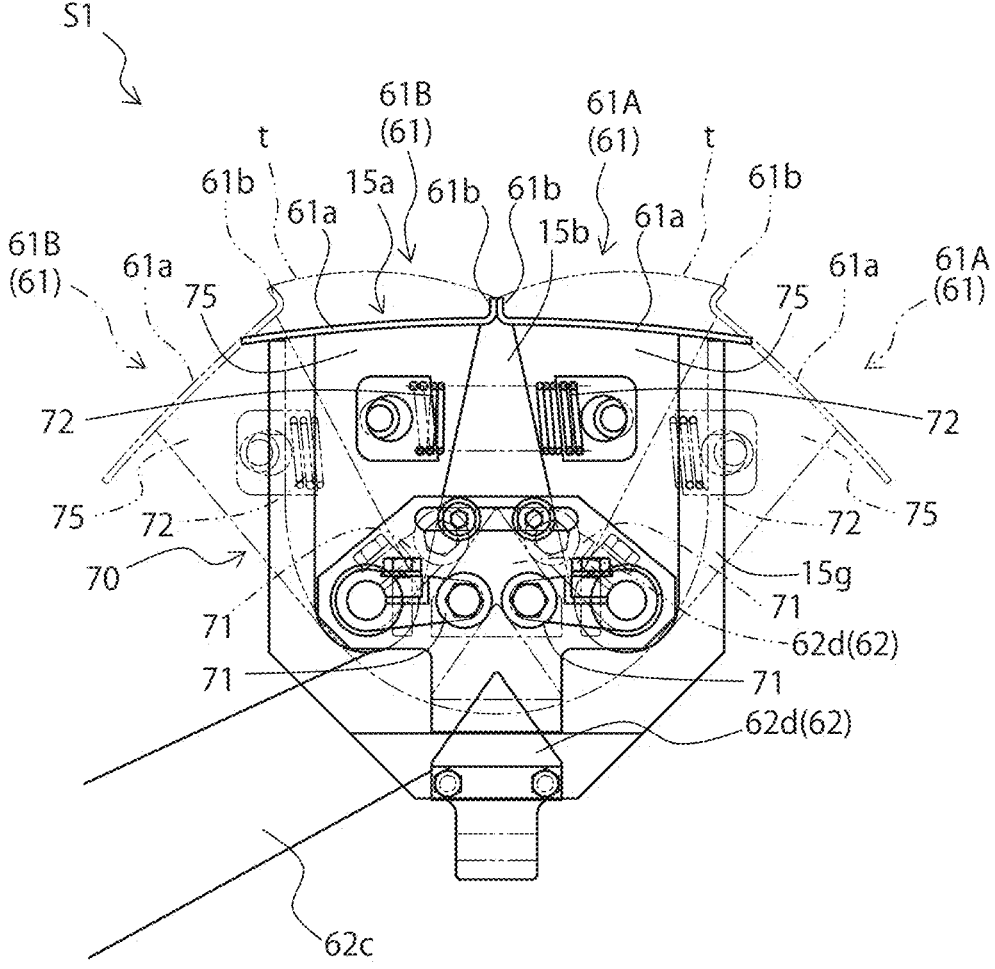
FIG. 5 is a front view showing a tray shown in FIG. 4 (see arrow "V" in FIG. 4)

FIG. 4 is a side view showing a part of an example of the stick introduction machine 10 according to a second embodiment. FIG. 5 is a front view showing a tray 15 (in particular, a tray 15 positioned at the supply section S1) shown in FIG. 4 (see arrow "V" in FIG. 4).

In the present embodiment, elements identical or corresponding to those in the first embodiment described above are marked with the same reference numerals and their detailed descriptions are omitted.

In the first embodiment described above, the guides 19 and the cover 22 that are installed in a fixed manner (see FIG. 1) are provided as popping-out restricting units that limit the pop-out of stick-shaped objects T from the holding space 15s of each tray 15, but such popping-out restricting units may be provided to be movable.

In the present embodiment, a unique supply opening shutter 61 (a first popping-out restricting unit) is provided with each of a plurality of trays 15, and each supply opening shutter 61 is provided to move along the endless track together with a corresponding tray 15. Each supply opening shutter 61 is opened and closed by a shutter opening-closing mechanism 70 under the control of the control unit 50 (see FIG. 2). Specifically, each supply opening shutter 61 opens the supply opening section 15a of a corresponding tray 15 at the supply section S1. Each supply opening shutter 61 also covers a supply opening section 15a at least partially while moving at least a part (in the present example, the whole) of the portion of the endless track between the supply section S1 and the release section S2 (the conveyance track section; in particular, the portion where each tray 15 moves from the supply section S1 towards the release section S2) and restricts a plurality of stick-shaped objects T from popping out of a holding space 15s through the supply opening section 15a.

In the example shown in FIGS. 4 and 5, each of the supply opening shutters 61 provided with respect to the four trays 15 respectively has a first shutter 61A and a second shutter 61B that can be placed in an open position to open the supply opening section 15a and in a closed position to close the supply opening section 15a. A first shutter 61A and a second shutter 61B cover a supply opening section 15a in the closed position and open the supply opening section 15a at least partially (in the present example, entirely) in the open position.

Each of a first shutter 61A and a second shutter 61B has a shutter body 61a and a shutter uprise portion 61b connected to one end of the shutter body 61a. A shutter uprise portion 61b extends from a corresponding shutter body 61a to protrude outwardly (in other words, toward the outside with respect to a holding space 15s), and the shutter body 61a and the shutter uprise portion 61b have a generally L-shaped cross-section as a whole. The joint portion (the bend portion) of a shutter body 61a and a shutter uprise portion 61b is rounded on the holding space 15s side (i.e., on the surface exposed to a holding space 15s).

In a state where a first shutter 61A and a second shutter 61B placed in the closed position, the shutter uprise portion 61b of the first shutter 61A and the shutter uprise portion 61b of the second shutter 61B contact each other and the supply opening section 15a is covered by a supply opening shutter (the first shutter 61A and the second shutter 61B) without any gaps. In particular, the contact between shutter uprise portions 61b is a surface contact, and assuming that a first shutter 61A and a second shutter 61B are arranged in the closed position at the supply section S1, the contact surface of each shutter uprise portion 61b extends in the height direction (in the vertical direction).

In a state where a supply opening shutter 61 is placed in the closed position, a gap may be provided between the shutter uprise portions 61b and/or between a tray 15 (the supply side end surface portion that demarcates the supply opening section 15a) and the shutter bodies 61a. However, such gaps are preferably as small as possible from a standpoint of restricting stick-shaped objects T from popping out of a holding space 15s, and for example may be smaller than any one side of a stick-shaped object T.

Each shutter body 61a is attached to a support swing member 75 that is provided to be able to swing, and swings together with the support swing member 75 to be placed in an open position (see dash-dot-dot lines in FIG. 5) and in a closed position (see solid lines in FIG. 5). Support swing members 75 for a first shutter 61A and a second shutter 61B, which form a supply opening shutter 61, are connected to each other by an opening-closing urging unit 72, which may be formed by a tension spring or the like, and receive a force toward each other (i.e., a force to approach each other). Further, each support swing member 75 is attached to a unique opening-closing swing unit 71 and swings together with the unique opening-closing swing unit 71.

Opening-closing swing units 71 provided respectively for a first shutter 61A and a second shutter 61B forming a supply opening shutter 61 swing as a result of receiving force from a shutter actuator 62 (an actuator acting unit 62d), which in turn causes corresponding support swing members 75, shutter bodies 61a and shutter uprise portions 61b to swing. In FIG. 5, the swing trajectory of each shutter uprise portion 61b (in particular, the tip part) is indicated by the sign "t". As described above, a shutter opening-closing mechanism 70 that includes opening-closing swing units 71 and support swing members 75, is driven by the shutter actuator 62 to open and close a supply opening shutter 61.

In the example shown in FIG. 5, the respective opening-closing swing units 71 for a first shutter 61A and a second shutter 61B have a line symmetrical arrangement, and take on a line symmetrical swing behavior and swing posture as a result of receiving force from a common single actuator acting unit 62d. Specifically, each opening-closing swing unit 71 takes a swing posture such that the first shutter 61A and the second shutter 61B are placed in the closed position in a state where the actuator acting unit 62d is separated downward from each opening-closing swing unit 71 and does not exert any force on each opening-closing swing unit 71. On the other hand, when the actuator acting unit 62d exerts a force to push up each opening-closing swing unit 71 (in the example shown in FIG. 5, a roller provided at one end portion of each opening-closing swing unit 71) from below, each opening-closing swing unit 71 takes a swing posture such that the first shutter 61A and the second shutter 61B are placed in the open position.

In the example shown in FIG. 4, the shutter actuator 62 comprises: an actuator body 62a that is fixedly supported by an actuator support member 65; and an actuator protrusion 62b that is capable of changing the amount of its protrusion in the vertical direction (in the downward direction) from the actuator body 62a under control of the control unit 50 (see FIG. 2). The actuator protrusion 62b is connected to the actuator acting unit 62d via the connecting member 62c, and the connecting member 62c and the actuator acting unit 62d are lowered and raised integrally in the height direction according to the advance movement and the retreat movement of the actuator protrusion 62b from the actuator body 62a. Specifically, the actuator acting unit 62d is lowered as the amount of the downward projection of the actuator protrusion 62b increases, and the actuator acting unit 62d is raised as the amount of the downward projection of the actuator protrusion 62b decreases.

As described above, in the present embodiment, a supply opening shutter 61, which is driven open and closed by the shutter actuator 62, is provided to move with a tray 15 along the endless track and is placed in each of the open position and the closed position under control of the control unit 50.

A supply opening shutter 61 is placed in the open position at the supply section S1 and opens the supply opening section 15a of a corresponding tray 15. Then, a plurality of stick-shaped objects T supplied from the stick-shaped object supply device (not shown) provided upstream are supplied into the holding space 15s of the tray 15 through the opening of the supply opening shutter 61 placed in the open position and the supply opening section 15a.

After the supply of a plurality of stick-shaped objects T to the holding space 15s of a corresponding tray 15 is completed, a supply opening shutter 61 is placed in the closed position and closes the supply opening section 15a of the corresponding tray 15. The tray 15 then moves from the supply section S1 to the release section S2, together with the corresponding supply opening shutter 61 that closes the supply opening section 15a. The supply opening shutter 61 may be placed in the closed position at the supply section S1 or may be placed in the closed position after starting to move from the supply section S1 toward the release section S2.

When a tray 15 reaches the release section S2, as in the first embodiment described above, a plurality of stick-shaped objects T in the tray 15 fall through the release opening section 15b in an upright posture, and are received and stored by the first funnel 31 and the closed second funnel 32 waiting at the relay supply position Ps. The plurality of stick-shaped objects T are then lowered from the relay supply position Ps together with the first funnel 31 and the second funnel 32, and by causing the opening-closing unit of the second funnel 32 to open at the relay release position Pr, the plurality of stick-shaped objects T fall towards a bag B that is waiting below the second funnel 32 and is in a state where the mouth portion is opened, and are stored in the bag B.

As explained above, according to the present embodiment, while a tray 15 is moving from the supply section S1 to the release section S2, the supply opening section 15a of the tray 15 is closed by a supply opening shutter 61, so that the supply opening shutter 61 prevents stick-shaped objects T in the tray 15 from popping out via the supply opening section 15a. Therefore, the installation of the guides 19 (see FIGS. 1 and 2), which are installed in the first embodiment described above, is unnecessary.

In the present embodiment, while a tray 15 is moving from the supply section S1 to the release section S2, the release opening section 15b of the tray 15 is covered by the cover 22 (in particular, the restriction surface 22s; see FIG. 1) as in the first embodiment above, and the cover 22 prevents stick-shaped objects T in the tray 15 from flying out via the release opening section 15b.

Further, a first shutter 61A and a second shutter 61B that are placed in the closed position close a supply opening section 15a while contacting each other, by means of the surface contact between the shutter uprise portions 61b. As a result of thus using the surface contact between the shutter uprise portions 61b, which have a relatively large contact area, the contact force per unit area acting between the first shutter 61A and the second shutter 61B that are placed in the closed position, can be reduced. Therefore, even if a stick-shaped object T is pinched between shutters 61A and 61B in the closed position, it can be prevented that an excessively large force acts on the stick-shaped object T from the shutters 61A and 61B, reducing damage to the stick-shaped object T. In particular, the joint portion of a shutter body 61a and a shutter uprise portion 61b being rounded on the holding space 15s side can suppress a stick-shaped object T from being pinched between shutters 61A, 61B in the closed position and also may prevent excessive force from being exerted on a stick-shaped object T from the shutters 61A, 61B.

First Variant Example

In the second embodiment described above (see FIGS. 4 and 5), the supply opening shutters 61 and the shutter actuator 62 are provided instead of the guides 19 (see FIGS. 1 and 2), but instead of the cover 22 (see FIG. 1), a restricting mechanism (not shown in the drawings; the second popping-out restricting unit) that restricts stick-shaped objects T in a tray from popping out via the release opening section 15b may be installed on each tray 15.

This second popping-out restricting unit may have any configuration that can restrict the pop-out of stick-shaped objects T from a tray 15 through the release opening section 15b. As an example, the second popping-out restricting unit may be formed by a shutter that opens and closes a release opening section 15b and an actuator that drives the shutter to open and close, as in the mechanisms 61, 62 aathat restrict the pop-out of stick-shaped objects T from a tray 15 via the supply opening section 15a in the second embodiment described above (not shown in the drawings).

Specifically, a second popping-out restricting unit may be installed with a tray 15 so as to move along the endless track together with the tray 15, may open the release opening section 15b at the release section S2, and while the tray 15 is moving along at least a part of (e.g. the whole of) a portion of the endless track between the supply section S1 and the release section S2 (the conveyance track section; in particular, a portion where the tray 15 moves from the supply section S1 towards the release section S2), the second popping-out restricting unit may at least partially cover the release opening section 15b to restrict a plurality of stick-shaped objects T from popping out of the holding space 15s through the release opening section 15b.

As a result of installing this second popping-out restricting unit on each tray 15, the installation of the cover (FIG. 1) for covering the release opening section 15b of each tray 15 is unnecessary.

Second Variant Example

Figure 6:
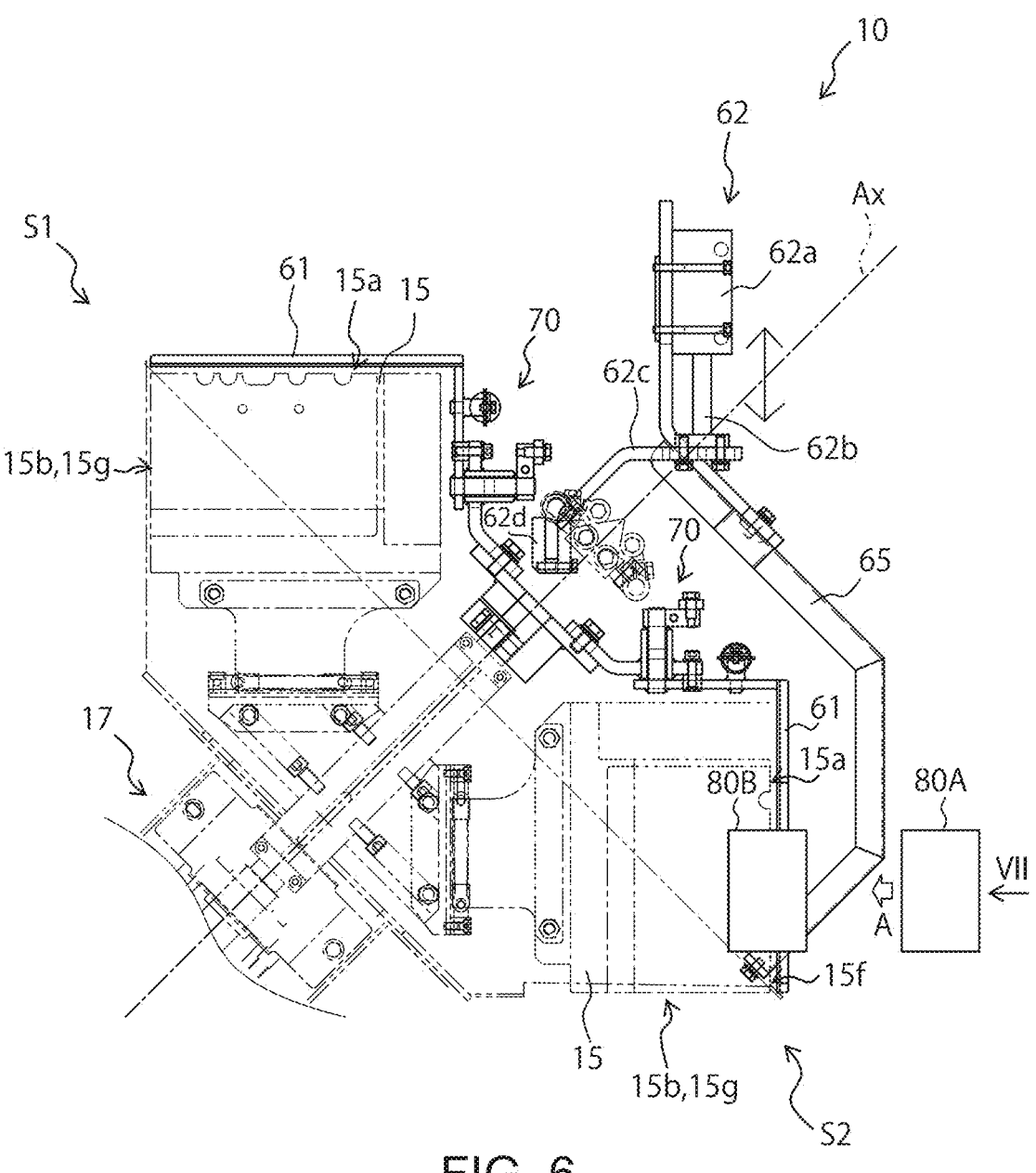
FIG. 6 is a side view showing a portion of an example of a stick introduction machine according to a second variant example.
Figure 7:
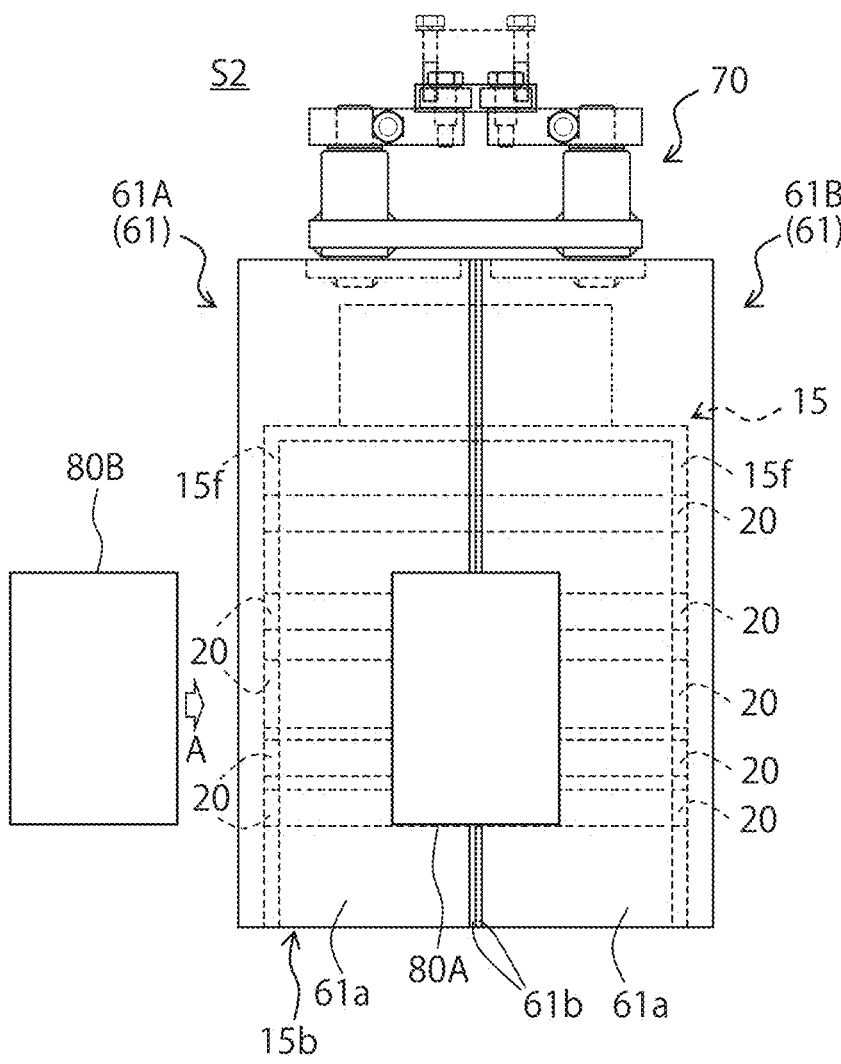
FIG. 7 is a front view (see arrow "VII" in FIG. 6) of a tray shown in FIG. 6 (in particular, a tray located at a release section).

FIG. 6 is a side view showing a portion of an example of the stick introduction machine 10 according to a second variant example. FIG. 7 is a front view (see arrow "VII" in FIG. 6) of a tray 15 shown in FIG. 6 (in particular, a tray 15 located at the release section S2).

In the present variant example, elements identical or corresponding to those in the second embodiment described above are marked with the same reference numerals, and their detailed descriptions are omitted.

The stick introduction machine (a conveyance apparatus) 10 may comprise a gas blowing unit (a blower) that blows gas towards at least one of "between a first shutter 61A and a second shutter 61B" and "between a tray (a holding member) 15 and at least one of a first shutter 61A and a second shutter 61B" at the release section S2.

In the example shown in FIGS. 6 and 7, a plurality of air blowing units (i.e., a first air blowing unit 80A and a second air blowing unit 80B) are provided at the release section S2. The air blowing units 80A, 80B are provided outside with respect to a tray 15 and a supply opening shutter 61 (the first shutter 61A and the second shutter 61B) that are positioned at the release section S2.

The first air blowing unit 80A blows air (compressed air) A towards between the first shutter 61A and the second shutter 61B in the closed position (in particular, between the shutter uprise portions 61b) that cover the supply opening section 15a of a tray 15 positioned at the release section S2.

The second air blowing unit 80B blows air (compressed air) A toward between a tray 15 (in particular, a supply side end surface portion 15f that demarcates the supply opening section 15a) and a supply opening shutter 61 in the closed position (in particular, the first shutter 61A located downstream) that are positioned at the release section S2. In particular, in the present variant example, air A is blown from the second air blowing unit 80B toward notches 20 that are formed in the supply side end surface portion 15f and locally form a large gap with respect to a supply opening shutter 61 (a first shutter 61A).

Stick-shaped objects T supplied in a tray 15 at the supply section S1 may be pinched between shutters 61A, 61B in the closed position (in particular, between the shutter uprise portions 61b) and/or between a supply opening shutter 61 in the closed position and a tray 15 while moving from the supply section S1 to the release section S2. In particular, stick-shaped objects T tend to be pinched, under the influence of gravity, between the first shutter 61A of a supply opening shutter 61, which is located on the gravity action direction side when moving from the supply section S1 towards the release section S2, and a tray 15 (the supply side end surface portion 15f).

If a stick-shaped object T is pinched between shutters 61A, 61B (in particular, between the shutter uprise portions 61b) at the release section S2, the stick-shaped object T receives the air A from the first air blowing unit 80A and is thereby encouraged to be released from between the shutters 61A, 61B. As a result, the stick-shaped object T pinched between the shutters 61A, 61B can be effectively released toward the first funnel 31 and the second funnel 32 (see FIG. 2) at the release section S2.

Further, if a stick-shaped object T is pinched between a supply opening shutter 61 (e.g., the first shutter 61A) and a tray 15 at the release section S2, air A from the second air blowing unit 80B is blown on the stick-shaped object T and is thereby encouraged to be released from between the supply opening shutter 61 and the tray 15. As a result, a stick-shaped object T pinched between a supply opening shutter 61 and a tray 15 can be effectively released toward the first funnel 31 and the second funnel 32 at the release section S2.

The gas blowing unit is not limited to the first air blowing unit 80A and the second air blowing unit 80B shown in FIGS. 6 and 7, but can blow gas toward a tray 15 and/or a supply opening shutter 61 at any position and in any form.

For example, in the example shown in FIGS. 6 and 7, the gas blowing unit (the first air blowing unit 80A and the second air blowing unit 80B) is provided at the release section S2, but a gas blowing unit may be provided at a location other than the release section S2. For example, in the middle of the path where a tray 15 and a supply opening shutter 61 moves from the supply section S1 towards the release section S2 (for example, a section closer to the release section S2 compared to the supply section S1), a first air blowing unit 80A and/or a second air blowing unit 80B may be provided, and the first air blowing unit 80A and the second air blowing unit 80B blow air (such as compressed air) onto a tray 15 and a supply opening shutter 61. In this case, while a tray 15 and a supply opening shutter 61 are moving from the supply section S1 towards the release section S2, a stick-shaped object T can be effectively prevented from being pinched between the shutters 61A, 61B (in particular, between the shutter uprise portions 61b) and/or between the supply opening shutter 61 (for example, the first shutter 61A) and the tray 15.

Further, in addition to the second air blowing unit 80B shown in FIGS. 6 and 7, a third air blowing unit (not shown in the drawings) that blows air between a second shutter 61B and a tray 15 (in particular, the supply side end surface portion 15f) may be provided. Further, the first air blowing unit 80A shown in FIGS. 6 and 7 blows air A only onto a part of the portion between shutters 61A and 61B (in particular, between shutter uprise portions 61*b*), but air A may be blown onto the whole of this portion between shutters 61A and 61B. Similarly, the second air blowing unit 80B shown in FIGS. 6 and 7 blows air A only onto a part of the portion between a tray 15 (the supply side end surface portion 15*f*) and a supply opening shutter 61 (the first shutter 61A), but air A may be blown onto the whole of this portion between a tray 15 and a supply opening shutter 61.

Other Variant Examples

The above-described embodiments and variant examples may be subject to omissions, substitutions and modifications in various forms without departing from the scope and the intent of the appended claims.

For example, by providing a mechanism to promote proper posture of stick-shaped objects T stored in a tray 15, a plurality of stick-shaped objects T can be more reliably released from a tray 15 in a desired erect posture. Such a mechanism to promote proper posture of stick-shaped objects T may have any configuration and may be, for example, a mechanism to vibrate a tray 15 significantly and/or finely.

For example, a vibration device (not shown in the drawings) may be attached to each tray 15, and the vibration device may shake each tray 15 to promote proper posture of a plurality of stick-shaped objects T in each tray 15. Further, the movement driving unit 17 (a servo motor 17*a*) may move each tray 15 in the direction from the release section S2 towards the supply section S1 on the way from the supply section S1 to the release section S2. By varying the conveyance acceleration of each tray 15 by the movement driving unit 17, the inertia force may be applied to a plurality of stick-shaped objects T in each tray 15, thereby promoting proper posture of the plurality of stick-shaped objects T in each tray 15.

Further, in each of the above embodiments, four trays 15 are provided, but the number of trays 15 is not limited.

Further, the trays 15 may be provided in a replaceable manner. For example, a plurality of types of trays 15 of which the holding spaces 15*s* have different sizes (volumes) and different shapes from each other, may be prepared in advance. In this case, the optimal trays 15 for the specific size/shape of stick-shaped objects T and the number of stick-shaped objects T to be introduced into a tray 15 (and thus into a bag B) may be selected by the operator and may be interchangeably attached to the stick introduction machine 10 (in particular, the movement driving unit 17). As a result of replaceable trays 15 being provided in this manner, the stick introduction machine 10 can flexibly respond to various sizes of stick-shaped objects T and to various numbers of stick-shaped objects T to be introduced into a bag B.

Further, various types of sensors may be installed as needed. For example, the detection sensors 25 described above detect stick-shaped objects T protruding from a tray 15 via the supply opening section 15*a*, but a detection sensor (not shown in the drawings) may be provided to detect a stick-shaped object(s) T protruding from a tray 15 via the release opening section 15*b*. Further, there may be a sensor capable of detecting the presence of a tray 15 on the endless track (for example, the presence of a tray 15 at a specific position such as the supply section S1 and/or the release section S2). Further, a sensor may be provided that can detect whether or not a stick-shaped object T protrudes from a bag B.

The detection results of various sensors may be transmitted to the control unit 50 and may be used for any process and any application under the control of the control unit 50. For example, a bag B that is determined to have a stick-shaped object T protruding based on the detection results of a sensor may be discharged, by an out-of-system discharge device under the control of the control unit 50, to a route different from the normal route where normal bags with a plurality of stick-shaped objects T properly contained are conveyed.

Further, a guide 19 and the cover 22 may have any shape, and for example, a guide 19 may have a single plate-like member or a plurality of plate-like members, and the cover 22 may have a single line-like member or a plurality of line-like members.

Further, each tray 15 is intermittently transferred by the movement driving unit 17 in each of the above-mentioned embodiments, but may be continuously transferred without stopping intermittently.

Further, in each of the above-mentioned embodiments, the first funnel 31 and the second funnel 32 are separated from each other (see FIG. 2), but the first funnel 31 and the second funnel 32 may be connected to each other and provided as an integrated unit.

Further, the shape of the endless track is not limited and may be, for example, a shape including an elliptical shape, an egg shape, an oval shape, a polygonal shape, or a shape containing a straight track and a curved track.

It should be noted that the embodiments and variant examples disclosed in the present specification are in all respects illustrative only and are not to be construed as limiting. Therefore, elements that are equivalent or alternative to the elements shown as an example in the above-described embodiments and variant examples fall under the disclosed scope of the present specification, and the specification including the claims should be construed based not only on the above-described elements shown as an example but also on equivalent elements and alternative elements to the above-described elements. For example, the embodiments and variant examples described above may be combined in whole or in part, and embodiments other than those described above may be combined with the embodiments or variant examples described above. Further, the effects of the present disclosure described in the present specification are illustrative only, and other effects may be brought about.

The technical categories that embody the technical ideas described above are not limited. For example, the above-described technical ideas may be embodied by a computer program for having a computer execute one or more procedures (steps) included in a method of manufacturing or using the device described above. Further, the above-described technical ideas may be embodied by a computer-readable non-transitory recording medium in which such a computer program is recorded.

Additional Notes

The disclosed technology may also take the following aspects.
[Aspect 1]
A conveyance apparatus that conveys a plurality of stick-shaped objects, the conveyance apparatus comprising:
    a holding member that includes a holding space, a supply opening section and a release opening section, the supply opening section and the release opening section being connected to the holding space; and a movement driving unit that causes the holding member to move along an endless track including a supply section and a release section, wherein:

the holding member receives supply of the plurality of stick-shaped objects via the supply opening section at the supply section and the plurality of stick-shaped objects are held in the holding space, and the holding member releases the plurality of stick-shaped objects from the holding space towards outside via the release opening section, at the release section.

[Aspect 2]

The conveyance apparatus as defined in aspect 1, wherein:

the endless track is a track that is centered on a central axis, and the central axis forms an angle greater than 0 degrees and less than 90 degrees with respect to a horizontal axis extending in a horizontal direction.

[Aspect 3]

The conveyance apparatus as defined in aspect 1 or 2, wherein:

a plurality of holding members are provided, and the movement driving unit causes the plurality of holding members to move along the endless track.

[Aspect 4]

The conveyance apparatus as defined in any of aspects 1 to 3, comprising a first popping-out restricting unit that is installed with the holding member to move along with the holding member along the endless track, opens the supply opening section at the supply section, and at least partially covers the supply opening section to restrict the plurality of stick-shaped objects from popping out from the holding space via the supply opening section during the holding member moving along at least a part of a conveyance track section that is a section of the endless track between the supply section and the release section.

[Aspect 5]

The conveyance apparatus as defined in aspect 4, wherein:

the first popping-out restricting unit has a first shutter and a second shutter that are able to be placed in an open position where the supply opening section is opened and in a closed position where the supply opening section is closed, and each of the first shutter and the second shutter has a shutter body and a shutter uprise portion connected to one end portion of the shutter body, the shutter body covering the supply opening section in a closed position and at least partially opening the supply opening section in an open position.

[Aspect 6]

The conveyance apparatus as defined in any of aspects 1 to 5, comprising a second popping-out restricting unit that is installed with the holding member to move along with the holding member along the endless track, opens the release opening section at the release section, and at least partially covers the release opening section to restrict the plurality of stick-shaped objects from popping out from the holding space via the release opening section during the holding member moving along at least a part of a conveyance track section that is a section of the endless track between the supply section and the release section.

[Aspect 7]

The conveyance apparatus as defined in any of aspects 1 to 6, comprising a first popping-out restricting unit that extends along at least a part of a conveyance track section that is a section of the endless track between the supply section and the release section and restricts the plurality of stick-shaped objects from popping out from the holding space via the supply opening section in at least a part of the conveyance track section.

[Aspect 8]

The conveyance apparatus as defined in aspect 7, wherein:

the holding member has a notch, and during the holding member moving in at least a part of the conveyance track section, at least a part of the first popping-out restricting unit is positioned in the holding space while penetrating the notch.

[Aspect 9]

The conveyance apparatus as defined in any of aspects 1 to 8, comprising a second popping-out restricting unit that extends in an arc shape along at least a part of a conveyance track section that is a section of the endless track between the supply section and the release section, and faces an end surface potion of the holding member demarcating the release opening section in at least a part of the conveyance track section to restrict the plurality of stick-shaped objects from popping out from the holding space via the release opening section:

wherein the end surface portion has a curved surface shape that adapts to a curved surface of a restriction surface facing the end surface portion of the second popping-out restricting unit.

[Aspect 10]

The conveyance apparatus as defined in any of aspects 1 to 9, comprising:

a popping-out detection sensor that detects pop-out of the plurality of stick-shaped objects from the holding space of the holding member in a conveyance track section that is a section of the endless track between the supply section and the release section; and a control unit that receives detection results by the popping-out detection sensor.

[Aspect 11]

The conveyance apparatus as defined in any of aspects 1 to 10, comprising a relay storage unit that temporarily stores the plurality of stick-shaped objects released from the holding member via the release opening section and releases the plurality of stick-shaped objects towards a container, wherein the relay storage unit moves between a relay supply position for receiving the plurality of stick-shaped objects released from the holding member via the release opening section and a relay release position for releasing the plurality of stick-shaped objects towards the container.

[Aspect 12]

The conveyance apparatus as defined in any of aspects 1 to 11, comprising a control unit, wherein the movement driving unit has a servo motor that is driven under control of the control unit.

[Aspect 13]

A conveyance method of conveying a plurality of stick-shaped objects by using a conveyance apparatus, wherein:

the conveyance apparatus comprises: a holding member that includes a holding space, a supply opening section and a release opening section, the supply opening section and the release opening section being connected to the holding space; and a movement driving unit that causes the holding member to move along an endless track including a supply section and a release section, the conveyance method comprising the steps of:

supplying the plurality of stick-shaped objects to the holding member via the supply opening section at the supply section, the plurality of stick-shaped objects being held in the holding space; and releasing the plurality of stick-shaped objects from the holding space to outside via the release opening section at the release section.

[Aspect 14]

The conveyance method as defined in aspect 13, wherein:

the conveyance apparatus comprises a first shutter and a second shutter that are able to be placed in an open position where the supply opening section is opened and in a closed position where the supply opening section is closed, and at the release section, gas is blown towards at least one of the following:

between the first shutter and the second shutter; and between the holding member and at least one of the first shutter and the second shutter.

The invention claimed is:

1. A conveyance apparatus that conveys a plurality of stick-shaped objects, the conveyance apparatus comprising:

a holding member that includes a holding space, a supply opening section and a release opening section, the supply opening section and the release opening section being connected to the holding space; and a movement driving unit that causes the holding member to move along an endless track including a supply section and a release section, wherein:

the holding member receives supply of the plurality of stick-shaped objects via the supply opening section at the supply section and the plurality of stick-shaped objects are held in the holding space, and the holding member releases the plurality of stick-shaped objects from the holding space towards outside via the release opening section, at the release section.

2. The conveyance apparatus as defined in claim 1, wherein:

the endless track is a track that is centered on a central axis, and the central axis forms an angle greater than 0 degrees and less than 90 degrees with respect to a horizontal axis extending in a horizontal direction.

3. The conveyance apparatus as defined in claim 1, wherein:

a plurality of holding members are provided, and the movement driving unit causes the plurality of holding members to move along the endless track.

4. The conveyance apparatus as defined in claim 1, comprising a first popping-out restricting unit that is installed with the holding member to move along with the holding member along the endless track, opens the supply opening section at the supply section, and at least partially covers the supply opening section to restrict the plurality of stick-shaped objects from popping out from the holding space via the supply opening section during the holding member moving along at least a part of a conveyance track section that is a section of the endless track between the supply section and the release section.

5. The conveyance apparatus as defined in claim 4, wherein:

the first popping-out restricting unit has a first shutter and a second shutter that are able to be placed in an open position where the supply opening section is opened and in a closed position where the supply opening section is closed, and each of the first shutter and the second shutter has a shutter body and a shutter uprise portion connected to one end portion of the shutter body, the shutter body covering the supply opening section in a closed position and at least partially opening the supply opening section in an open position.

6. The conveyance apparatus as defined in claim 1, comprising a second popping-out restricting unit that is installed with the holding member to move along with the holding member along the endless track, opens the release opening section at the release section, and at least partially covers the release opening section to restrict the plurality of stick-shaped objects from popping out from the holding space via the release opening section during the holding member moving along at least a part of a conveyance track section that is a section of the endless track between the supply section and the release section.

7. The conveyance apparatus as defined in claim 1, comprising a first popping-out restricting unit that extends along at least a part of a conveyance track section that is a section of the endless track between the supply section and the release section and restricts the plurality of stick-shaped objects from popping out from the holding space via the supply opening section in at least a part of the conveyance track section.

8. The conveyance apparatus as defined in claim 7, wherein:

the holding member has a notch, and during the holding member moving in at least a part of the conveyance track section, at least a part of the first popping-out restricting unit is positioned in the holding space while penetrating the notch.

9. The conveyance apparatus as defined in claim 1, comprising a second popping-out restricting unit that extends in an arc shape along at least a part of a conveyance track section that is a section of the endless track between the supply section and the release section, and faces an end surface potion of the holding member demarcating the release opening section in at least a part of the conveyance track section to restrict the plurality of stick-shaped objects from popping out from the holding space via the release opening section:

wherein the end surface portion has a curved surface shape that adapts to a curved surface of a restriction surface facing the end surface portion of the second popping-out restricting unit.

10. The conveyance apparatus as defined in claim 1, comprising:

a popping-out detection sensor that detects pop-out of the plurality of stick-shaped objects from the holding space of the holding member in a conveyance track section that is a section of the endless track between the supply section and the release section; and a control unit that receives detection results by the popping-out detection sensor.

11. The conveyance apparatus as defined in claim 1, comprising a relay storage unit that temporarily stores the plurality of stick-shaped objects released from the holding member via the release opening section and releases the plurality of stick-shaped objects towards a container, wherein the relay storage unit moves between a relay supply position for receiving the plurality of stick-shaped objects released from the holding member via the release opening section and a relay release position for releasing the plurality of stick-shaped objects towards the container.

12. The conveyance apparatus as defined in claim 1, comprising a control unit, wherein the movement driving unit has a servo motor that is driven under control of the control unit.

13. A conveyance method of conveying a plurality of stick-shaped objects by using a conveyance apparatus, wherein:

the conveyance apparatus comprises: a holding member that includes a holding space, a supply opening section and a release opening section, the supply opening section and the release opening section being connected to the holding space; and a movement driving unit that causes the holding member to move along an endless track including a supply section and a release section, the conveyance method comprising the steps of:

supplying the plurality of stick-shaped objects to the holding member via the supply opening section at the supply section, the plurality of stick-shaped objects being held in the holding space; and releasing the plurality of stick-shaped objects from the holding space to outside via the release opening section at the release section.

14. The conveyance method as defined in claim 13, wherein:

the conveyance apparatus comprises a first shutter and a second shutter that are able to be placed in an open position where the supply opening section is opened and in a closed position where the supply opening section is closed, and at the release section, gas is blown towards at least one of the following:

between the first shutter and the second shutter; and between the holding member and at least one of the first shutter and the second shutter.

* * * * *